United States Patent
Ban et al.

[11] Patent Number: 5,791,883
[45] Date of Patent: Aug. 11, 1998

[54] COMPRESSOR DRIVER

[75] Inventors: Takashi Ban; Takahisa Ban; Kunifumi Goto, all of Kariya, Japan

[73] Assignee: Kabushiki Kaisha Toyoda Jidoshokki Seisakusho, Kariya, Japan

[21] Appl. No.: 618,498

[22] Filed: Mar. 19, 1996

[30] Foreign Application Priority Data

Mar. 24, 1995 [JP] Japan .................................. 7-066472

[51] Int. Cl.⁶ .................................................. F04B 17/00
[52] U.S. Cl. .................................................. 417/410.5
[58] Field of Search .................................. 417/410.5

[56] References Cited

U.S. PATENT DOCUMENTS

| | | | |
|---|---|---|---|
| 4,950,135 | 8/1990 | Tojo et al. | 417/410.5 |
| 5,055,731 | 10/1991 | Nihei et al. | 310/309 |
| 5,090,876 | 2/1992 | Hashizume et al. | 417/410.5 |
| 5,123,818 | 6/1992 | Gormley | 417/410.5 |
| 5,239,222 | 8/1993 | Higuchi et al. | 310/309 |

FOREIGN PATENT DOCUMENTS

| | | |
|---|---|---|
| 0237145 | 9/1987 | European Pat. Off. . |
| 0332378 | 9/1989 | European Pat. Off. . |
| 0584479 | 3/1994 | European Pat. Off. . |
| 3938623 | 6/1990 | Germany . |
| 4122340 | 1/1992 | Germany . |
| 4333148 | 3/1994 | Germany . |
| 2285978 | 11/1990 | Japan . |
| 4063983 | 2/1992 | Japan ........................ 417/410.5 |
| 475483 | 3/1992 | Japan . |

Primary Examiner—Bibhu Mohanty
Attorney, Agent, or Firm—Brooks Haidt Haffner & Delahunty

[57] ABSTRACT

A compressor has a casing and a compressing member located within the casing. A gas drawn from a suction chamber into a compression chamber is compressed to be discharged to a discharge chamber in accordance with the operation of the compressing member. The compressor has a drive apparatus located within the casing for driving the compressing member. The drive apparatus has a fixed drive member fixed to the casing and having a plurality of electrode strips arranged in a single direction with a predetermined pitch. A second member is fixed to the compressing member. The compressing member is driven by relative movement generated between the fixed and movable drive members in response to Coulomb force generated between the fixed and movable drive members when voltage is applied to the electrode strips.

17 Claims, 11 Drawing Sheets

Fig. 7

COMPRESSOR DRIVER

BACKGROUND OF THE INVENTION

Field of the Invention

The present invention relates to a compressor for compressing a gas, and more particularly, to an electrostatic drive apparatus for driving a compressor.

Description of the Related Art

In a typical scroll type compressor, a fixed scroll having a base plate and a spiral element, and a movable scroll having a base plate and a spiral element are each enclosed in a housing such that the spiral elements are engaged with each other to define a compression chamber between them. A rotary shaft is supported in the housing, and a drive mechanism is located between the rotary shaft and the movable scroll. This drive mechanism converts rotational motion of the rotary shaft into orbital motion of the movable scroll. When the rotary shaft is rotated by a drive source such as a motor or an engine, the movable scroll is revolved by the drive mechanism around the axis of the fixed scroll to move the compression chamber from the periphery toward the center of the spiral elements, and thus the gas in the compression chamber is compressed.

In a typical piston type compressor, a plurality of cylinder bores are defined in a cylinder block, and a piston is movably accommodated in each cylinder bore. A suction chamber and a discharge chamber are defined in the housing such that they can communicate with the compression chamber of each cylinder bore. A rotary shaft is supported in the housing, and a drive mechanism including a swash plate is located between the rotary shaft and the pistons. The swash plate converts the rotational motion of the rotary shaft into reciprocating motion of the pistons. When the rotary shaft is rotated by a drive source such as an engine, the pistons are reciprocated with the drive mechanism to cause the gas in the suction chamber to be drawn into the compression chambers in the cylinder bores and also to cause the gas compressed in the compression chambers to be discharged into the discharge chamber.

However, in these prior art compressors, since the rotary shaft is designed to be connected to a drive source such as a motor or an engine to be rotated, the drive source is inevitably big, and further the entire compressor including the drive train is large. Further, in the case where the drive source is an engine of a vehicle, a great load is applied to the engine, which is likely to adversely influence the running of the vehicle.

In addition, the prior art scroll type compressor requires a drive mechanism for converting rotation of the rotary shaft into orbital motion of the movable scroll, whereas the prior art piston type compressor requires a drive mechanism for converting the rotation of the rotary shaft into reciprocating motion of the pistons. Accordingly, these mechanisms make the structure of the compressor complicated and add weight, and such motion conversion causes vibration and noise and leads to a reduction in driving efficiency.

SUMMARY OF THE INVENTION

The present invention was accomplished in view of the problems inherent in the prior art. It is a first objective of the present invention to provide a compressor that does not need to be connected to a large drive source such as a motor or an engine, but has a self-contained compact drive source to reduce the overall size and weight of the compressor.

It is a second objective of the present invention to provide a scroll type compressor requiring no eccentric drive mechanism for converting rotation of the drive shaft into orbital motion of a scroll. In this compressor, the movable scroll is revolved directly to simplify the structure, reduce vibration and noise and improve driving efficiency.

It is a third objective of the present invention to provide a piston type compressor requiring no drive mechanism for converting rotation of the rotary shaft into reciprocating motion of the pistons. In this compressor, the pistons are reciprocated directly to simplify the structure, reduce vibration and noise and improve driving efficiency.

To achieve the above objectives, a compressor has a casing and a compressing member located within the casing. A gas drawn from a suction chamber into a compression chamber is compressed to be discharged to a discharge chamber in accordance with the operation of the compressing member. The compressor comprises a drive apparatus located within the casing for driving the compressing member. The drive apparatus includes a fixed member fixed to the casing and having a plurality of electrode strips arranged in a single direction with a predetermined pitch. A second member is fixed to the compressing member. The compressing member is driven by relative movement generated between the fixed and movable members in response to Coulomb force generated between the fixed and movable members when voltage is applied to the electrode strips.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments together with the accompanying drawings in which:

FIGS. 5(a) to (h) are diagrammatic views explaining actions of the compressor shown in FIG. 1;

FIGS. 9 (a) to (d) are diagrammatic views explaining operation of a drive mechanism according to a fourth embodiment of the present invention:

DETAILED DESCRIPTION OF THE PREFERRED EMBODIMENTS

A first embodiment of the present invention embodied in a scroll type compressor will be described in detail referring to FIGS. 1 to 5.

Figure 1:
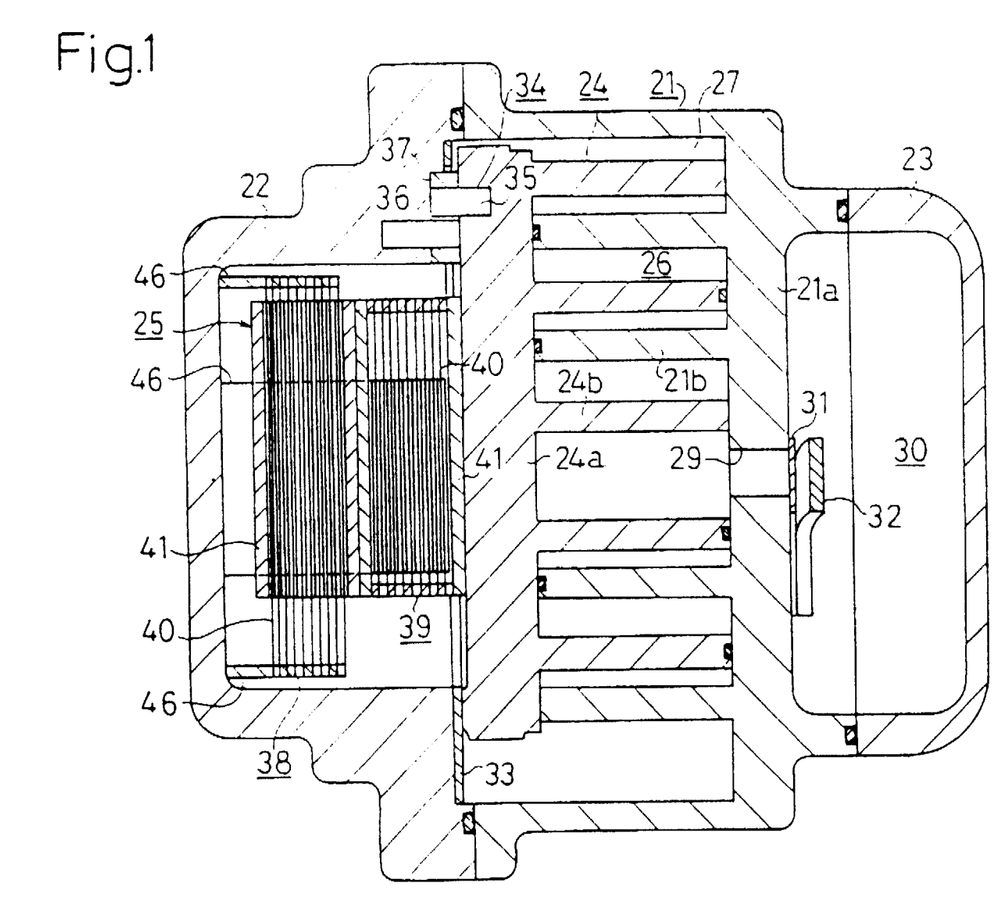
FIG. 1 is a cross-sectional view of the scroll type compressor according to a first embodiment of the present invention.
Figure 2:
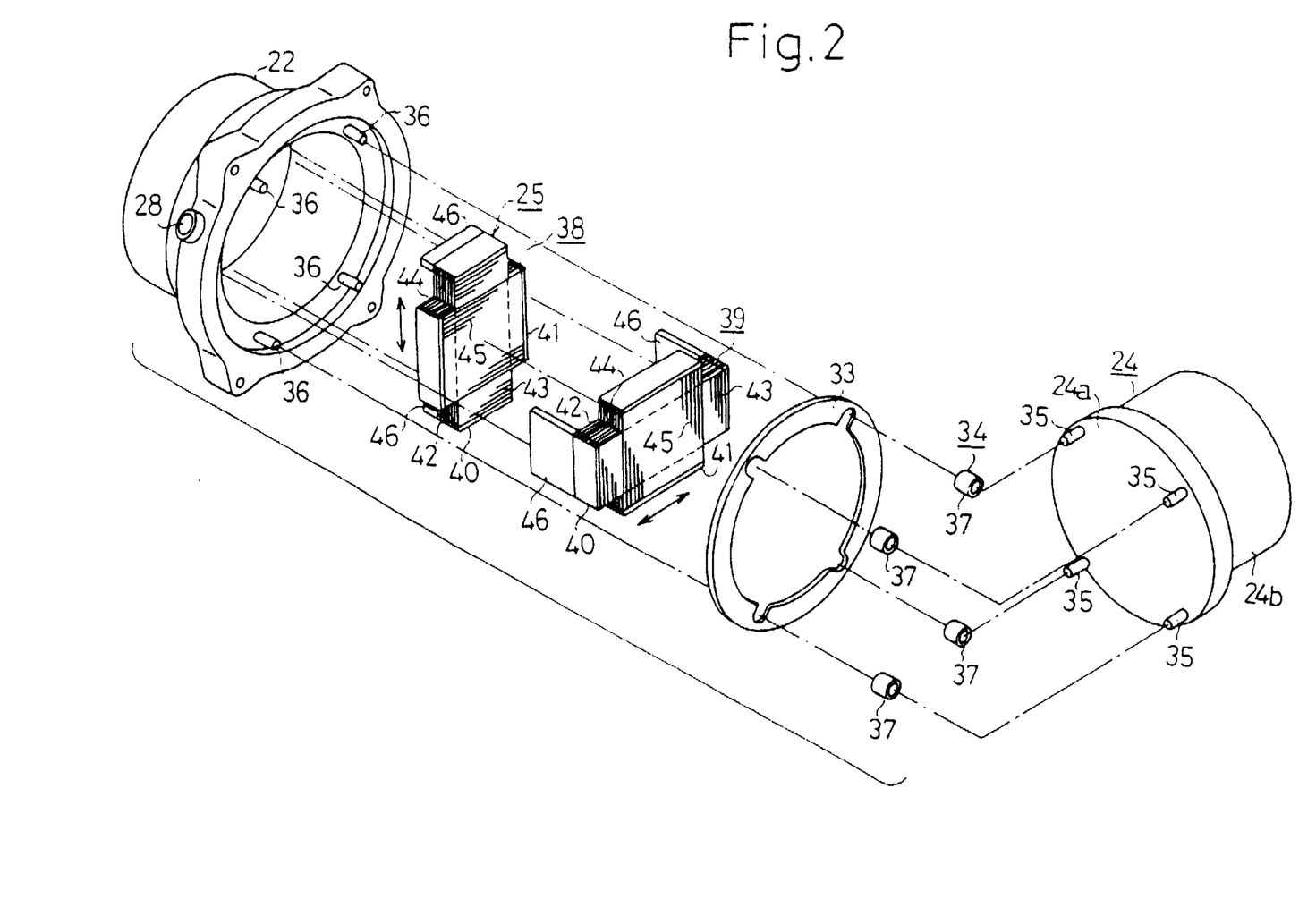
FIG. 2 is an exploded perspective view of part of the compressor shown in FIG. 1.

As shown in FIGS. 1 and 2, a fixed scroll 21 serves as a center housing, to which a front housing 22 and a rear housing 23 are fixed at the front end and the rear end, respectively. A movable scroll 24 is positioned to oppose the fixed scroll 21 and is revolved around the axis of the fixed scroll 21 by a drive unit 25 located in the front housing 22. The fixed scroll 21, front housing 22 and rear housing 23 constitute a casing of the compressor. These parts 21,22 and 23 are made of aluminum or an aluminum alloy so as to reduce the weight of the compressor. Further, the movable scroll 24 is also made of aluminum or an aluminum alloy so as to reduce the centrifugal force generated as it is revolved as well as to reduce the weight of the compressor.

The fixed scroll 21 has a base plate 21a and a spiral element 21b formed integrally with the base plate 21a on its inner surface. Likewise, the movable scroll 24 has a base plate 24a and a spiral element 24b formed integrally with the base plate 24a on its inner surface. The fixed and movable scrolls 21,24 are engaged with each other by the spiral elements 21b,24b, and the distal ends of the spiral elements 21b,24b are abutted against the base plates 24a,21a of the opposing scrolls 24,21, respectively. In this state, a compression chamber 26 is defined by the base plates 21a,24a and spiral elements 21b,24b of the fixed and movable scrolls 21,24.

A suction chamber 27 is defined between the inner wall surface of the fixed scroll 21 or the center housing and the outer wall surface of the spiral element 24b of the movable scroll 24. A suction port 28 is formed on the front housing 22 in a diagonal manner as shown in FIG. 2, and gas is drawn through the suction port 28 into the suction chamber 27. An outlet 29 is defined at the center of the base plate 21a of the fixed scroll 21, and the compression chamber 26 is allowed to communicate through this outlet 29 to a discharge chamber 30 in the rear housing 23. A discharge valve member 31 is applied to the outer surface of the base plate 21a of the fixed scroll 21 to cover the outer opening edge of the outlet 29. The open position of the valve member 31 is restricted by a retainer 32.

An annular fixed plate 33 made of steel is applied to an inner wall of the front housing 22 and is brought into sliding contact with the outer surface of the base plate 24a of the movable scroll 24. Of the reactive forces of compression resulting when the gas is compressed in the compression chamber 26, the partial reactive force acting upon the movable scroll 24 in the axial direction is received by the fixed plate 33.

An anti-rotation mechanism 34 is located between the movable scroll 24 and the front housing 22. Several pairs of pins 35,36 protrude from the base plate 24a of the movable scroll 24 and the inner end face of the front housing 22 in such a way that the pins 35,36 in each pair are located adjacent to each other with the distal ends of these pins 35,36 being spaced from each other by a predetermined distance. A ring 37 is fitted around each pair of pins 35,36, and rotation of the movable scroll 24 is restricted by cooperation of the ring 37 and the pins 35,36 to limit the movable scroll 24 to revolutional motion.

The drive unit 25, according to the first embodiment, consists of a pair of electrostatic actuators 38,39, as shown in FIGS. 1 and 2. Moving forces are designed to be applied to the movable scroll 24 by these electrostatic actuators 38,39 so as to move the scroll 24 in two directions, which intersect substantially orthogonal to each other, on a plane intersecting orthogonally with the axis of the movable scroll 24.

Specifically, the electrostatic actuators 38,39 each are provided with a fixed member 40 and a movable member 41 attached to the fixed member 40 such that the movable member 41 can be moved relative to the fixed member 40. Each fixed member 40 is composed of a plurality of sheets 42 made of an insulating material layered at predetermined intervals, and a multiplicity of strip electrodes 43 are embedded in these sheets 42 to be oriented in one direction at a predetermined pitch. Each movable member 41 is likewise composed of a plurality of sheets 44 made of an insulating material layered at predetermined intervals, and a multiplicity of strip electrodes 45 are embedded in these sheets 44 at a predetermined pitch like the strip electrodes 43 of the fixed member 40.

In these electrostatic actuators 38,39, the sheets 42 of each fixed member 40 are arranged interleaved with the sheets 44 of each movable member 41. Meanwhile, the fixed members 40 of the electrostatic actuators 38,39 are fixed at each end to the inner wall surface of the front housing 22 with fitting plates 46 with the strip electrodes 43 of one of the fixed members 40 being oriented to extend orthogonally to those of the other fixed member 40. Further, the movable members 41 of the electrostatic actuators 38,39 are connected to each other with the strip electrodes 45 of one of the movable members 41 being oriented to extend substantially orthogonal to those of the other movable member 41. Both movable members 41 are together fixed to the base plate 24a of the movable scroll 24.

Figure 3:
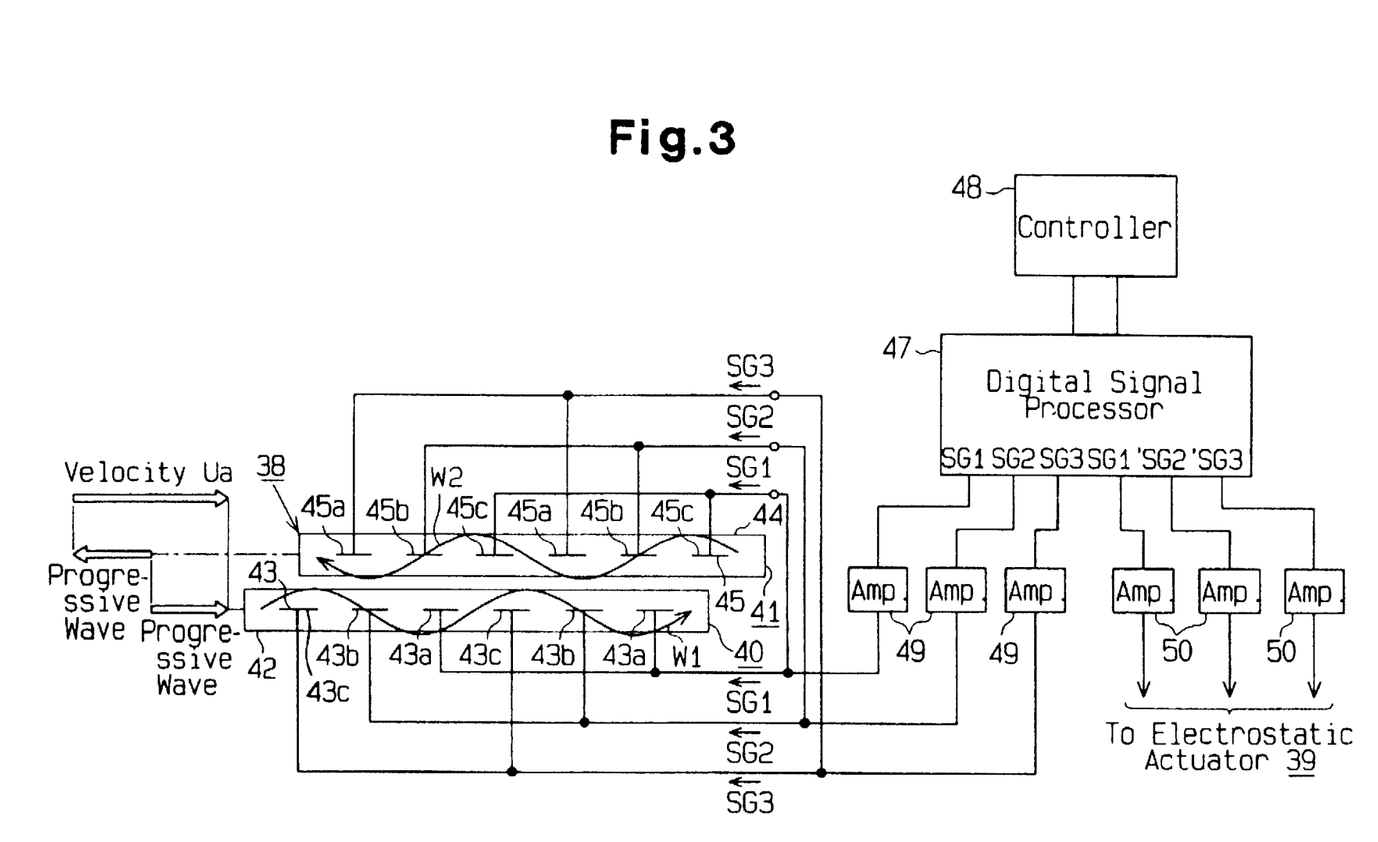
FIG. 3 is a control circuit for driving the compressor shown in FIG. 1.
Figure 4A:
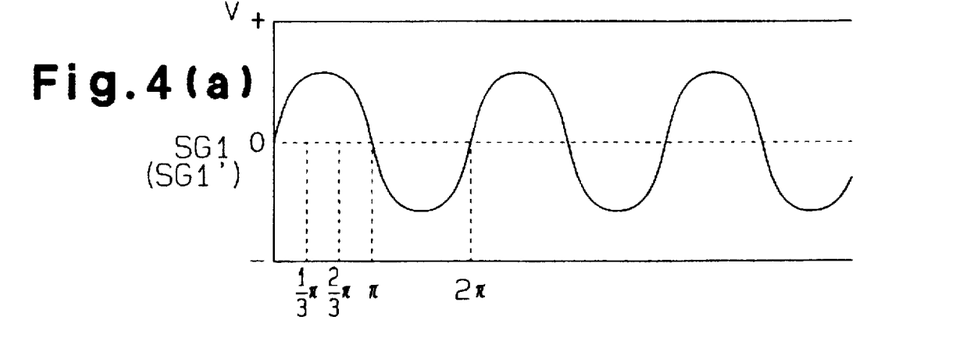
FIGS. 4(a),(b),(c) are explanatory graphs illustrating respectively first to third control signals from a DSP.
Figure 4B:
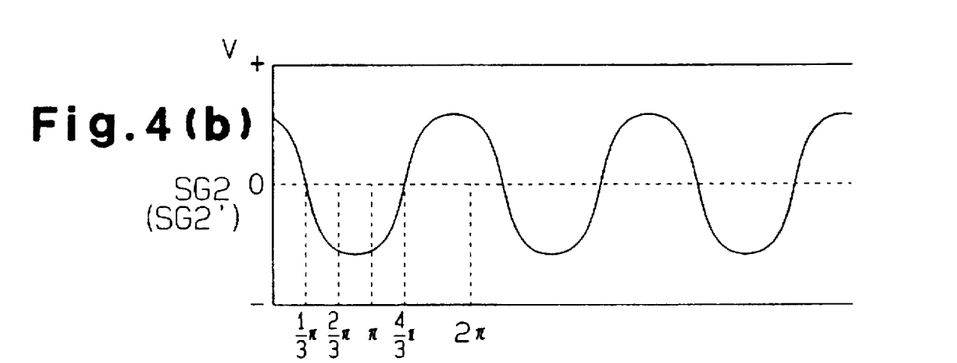
Figure 4C:
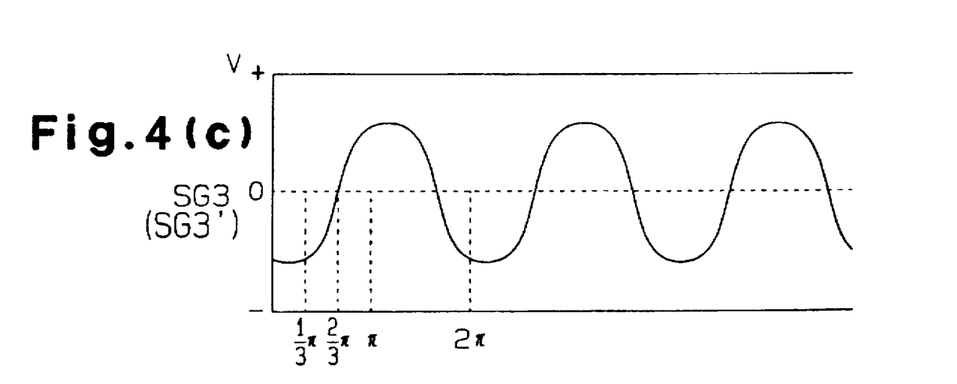

As shown in FIGS. 3 and 4, a digital signal processor (DSP) 47 having a D/A converter (not shown) is connected to the strip electrodes 43, 45 of the fixed and movable members 40, 41 of the electrostatic actuators 38, 39. This DSP 47 sends first, second and third control signals SG1 (SG1'), SG2(SG2'), SG3 (SG3') as shown in FIGS. 4(a), 4(b) and 4(c) to the electrostatic actuators 38,39 under the control of a control unit 48. As shown in FIGS. 4(a),4(b),4(c), the control signals SG1 to SG3 are voltage signals each having a phase difference of $2\pi/3$ from one another. Accordingly, the first to third control signals SG1 to SG3 and SG1' to SG3' constitute three-phase AC voltage signals.

Meanwhile, as shown in FIG. 3, the strip electrodes 43,45 of the fixed and movable members 40,41 in the electrostatic actuators 38,39 are classified into three electrode groups: a first electrode group 43a,45a, a second electrode group 43b,45b and a third electrode group 43c,45c. The electrodes 43a to 43c and 45a to 45c of the respective electrode groups are arranged according to this classification order. The arrangement order of the first to third electrodes 43,45 in the fixed member 40 is reversed with respect to that of the movable member 41 as seen in FIG. 3.

The DSP 47 performs a predetermined signal processing and D/A conversion of the digital signals receive from the control unit 48 to form first to third analog control signals SG1 to SG3 and SG1 to SG3'. These signals are amplified by amplifiers 49,50 and then applied to the first to third electrodes 43a to 43c and 45a to 45c, respectively.

It is known that progressive waves W1,W2, each having a predetermined wavelength, are formed on the fixed and movable members 40,41, as shown in FIG. 3, when the first to third control signals SG1 to SG3 or SG1' to SG3' are applied to the strip electrodes 43,45 of these members 40,41, respectively. However, since the arrangement order of the first to third electrodes 43a to 43c of the fixed member 40 is opposite to that of the movable member 41, the direction of the progressive wave W1 will be opposite to that of the progressive wave W2, as shown by the arrows.

These two progressive waves W1,W2 with different phases cause an electrostatic Coulomb force to be induced between the strip electrodes 43 of the fixed member 40 and the strip electrodes 45 of the associated movable member 41. The movable member 41 is moved by this Coulomb force relative to the fixed member 40 along the direction of the row of strip electrodes 43,45 (to the right in FIG. 3). In this case, since the velocity of the progressive wave W1 in the fixed member 40 and that of the progressive wave W2 in the movable member 41 are the same, and the direction of the progressive wave W1 and that of the progressive wave W2 are opposite to each other, the velocity Ua of the movable member 41 is twice as much as the velocity of the progressive wave W1 or W2.

In the electrostatic actuators 38,39, the movable members 41 are subjected to moving forces along the direction of the rows of strip electrodes 43,45. However, the movable members 41 are not subjected to moving forces orthogonal to said forces, i.e., in the longitudinal directions of the strip electrodes 43,45. The length of the movable members 41 in the longitudinal direction of the strip electrodes 43,45 is designed to be greater than that of the fixed members 40, so that the movable members 41 can be moved not only along the direction of the row of electrodes 43,45 but also in the longitudinal direction of the electrodes 43,45. Accordingly, in these two movable members 41, which are connected to each other such that the strip electrodes 45 in one member are orthogonal to those in the other member, when a moving force is applied to one movable member 41, the other movable member 41 is not prevented by the two fixed members 40 from moving in the same direction. Thus, the movable scroll 24 fixed to the movable member 41 can be moved in two different directions in the same plane.

A tangential velocity of the movable scroll 24 is set by an input device (not shown) to the control unit 48. The control unit 48 has already stored data necessary for revolving the movable scroll 24 at a preset velocity. The control unit 48 controls the DSP 47 based on the memory data and input data to change frequency, wave form, etc. of the first to third control signals SG1 to SG3 and SG1' to SG3'. Incidentally, the control unit 48, DSP 47 and amplifiers 49,50 are located outside the compressor, and signal lines (not shown) extended from the amplifiers 49,50 are connected to the electrostatic actuators 38,39 in the compressor.

Next, operation of the thus constructed compressor will be described.

The first to third control signals SG1 to SG3 or SG1' to SG3' are applied by the DSP 47 to the strip electrodes 43,45 of the electrostatic actuators 38,39 in the drive unit 25 under the control of the control unit 48. Then, a Coulomb force is induced between the strip electrodes 43 of each fixed member 40 and the strip electrodes 45 of each movable member 41 to cause the movable members 41 to move along the rows of strip electrodes 43,45, respectively. Since such moving forces are exerted in two directions orthogonal to each other on the same plane, the movable scroll 24 is allowed to perform a revolutional motion in a plane orthogonal to its axis, as shown in FIGS. 5(a) to 5(h).

Figure 5A:
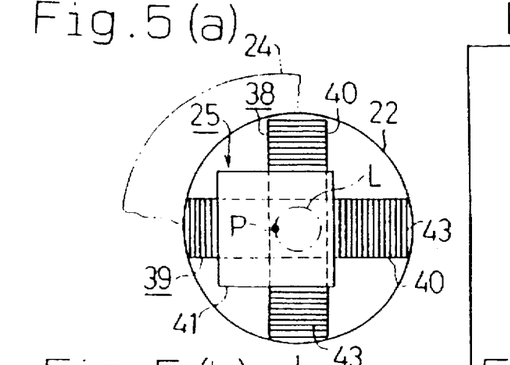
Figure 5B:
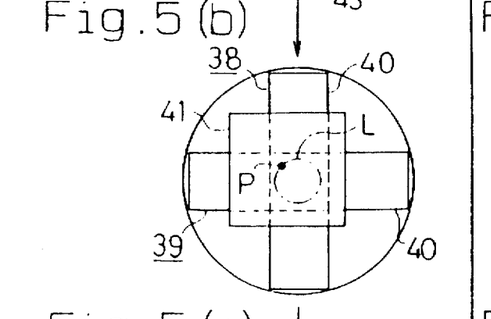
Figure 5C:
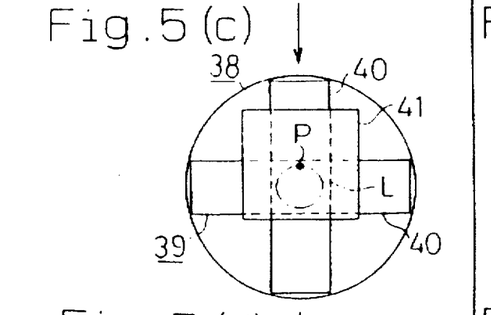
Figure 5D:
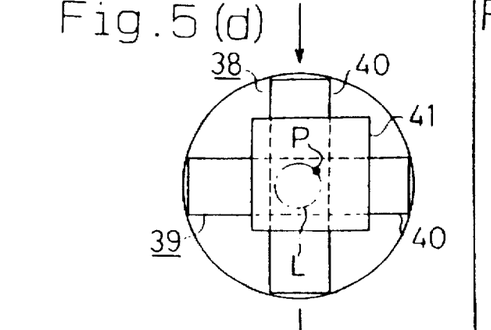
Figure 5E:
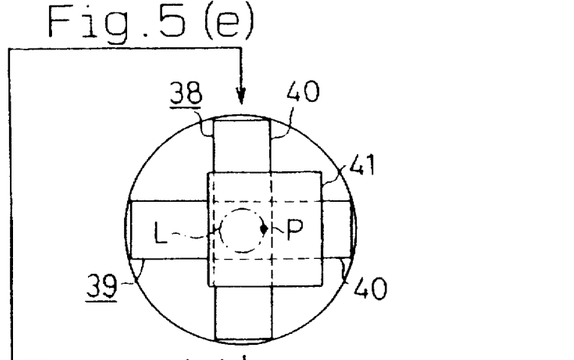
Figure 5F:
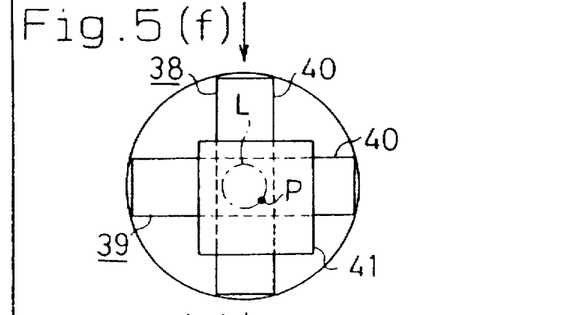
Figure 5G:
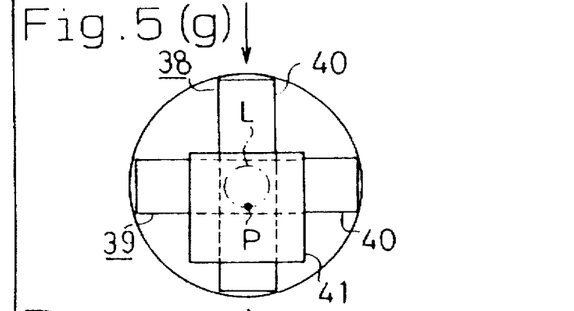
Figure 5H:
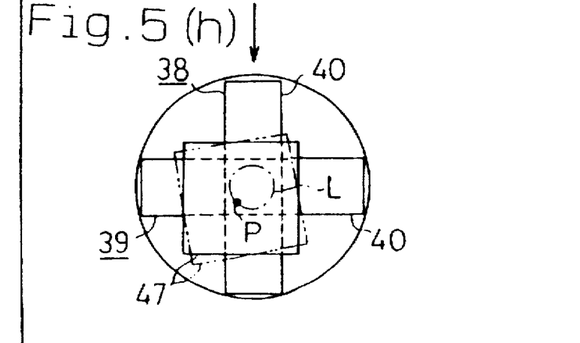

FIGS. 5(a) to 5(h) show a process, each with 45° phase shift, where the movable scroll 24 makes a 360° revolution on a predetermined revolutional orbit. In FIGS. 5(a) to 5(h), the revolutional orbit path L that the axis P of the movable scroll 24 follows is indicated by a dashed line. When the movable scroll 24 is revolved by 45° under actuation of the electrostatic actuators 38,39 where the axis P of the movable scroll 24 is located on the left position on the revolutional orbit L, as shown in FIG. 5(a), the axis P of the movable scroll 24 is moved to the upper left position on the revolutional orbit L, as shown in FIG. 5(b). In this state, the movable scroll 24 is further revolved by 45° under actuation of the electrostatic actuators 38,39, and the axis P of the movable scroll 24 is moved to the uppermost position on the revolutional orbit, as shown in FIG. 5(c). When the movable scroll 24 is further revolved under actuation of the electrostatic actuators 38,39, the axis P of the movable scroll 24 is moved along the revolutional orbit L successively, as shown in FIGS. 5(d) to 5(h).

By repeating these actions shown in FIGS. 5(a) to 5(h) as described above, the movable scroll 24 is revolved around the axis of the fixed scroll 21. As a result, the compression chamber 26 defined between these two scrolls 21 and 24 is moved from the periphery toward the center to compress the gas in the compression chamber 26.

The movable scroll 24 is revolved with its rotation being restricted by the anti-rotation mechanism 34 consisting of the ring 37 and pins 35,36. If the moving directions of the movable members 41 in the electrostatic actuators 38,39 were not restricted, the movable members 41 would tend to rotate as indicated by the two-dot chain line in FIG. 5(h). However, by incorporating the anti-rotation mechanism 34, this problem is eliminated.

As described above, the movable scroll 24 is revolved directly by the drive unit 25 consisting of two electrostatic actuators 38,39 that impart moving forces in different directions to effect compression of the gas. Accordingly, unlike conventional compressors, there is no need to connect the movable scroll to a large drive source such as a motor or an engine, but a compact drive source is incorporated into the compressor. This enables a reduction in the overall size and weight of the compressor. In addition, when the compressor according to this embodiment is employed for air-conditioning in a vehicle, the engine is free from the load of the compressor, and the compressor can be situated at any desired position regardless of the location of the engine.

Further, in the scroll type compressor according to this invention, unlike the prior art compressors, there is no need to provide a drive mechanism for converting rotational motion into a revolutional motion of the movable scroll, and the movable scroll 24 is revolved directly. Accordingly, not only is the internal structure of the compressor simplified, but vibration and noise are reduced, and driving efficiency is improved.

Moreover, the fixed members 40 and the movable members 41 in the electrostatic actuators 38,39 are composed of sheets 42,44 made of an insulating material that are layered. Accordingly, the electrostatic actuators 38,39 can produce great driving forces, although they are small and light. The level of the driving forces can be easily adjusted for different types of compressors by changing the number of sheets 42, 44. In addition, since the sheets 42,44 are thin and light, even if the number of sheets 42,44 to be layered is increased substantially so as to obtain much greater driving forces, the size and weight of the electrostatic actuators 38,39 are not substantially increased.

Figure 6:
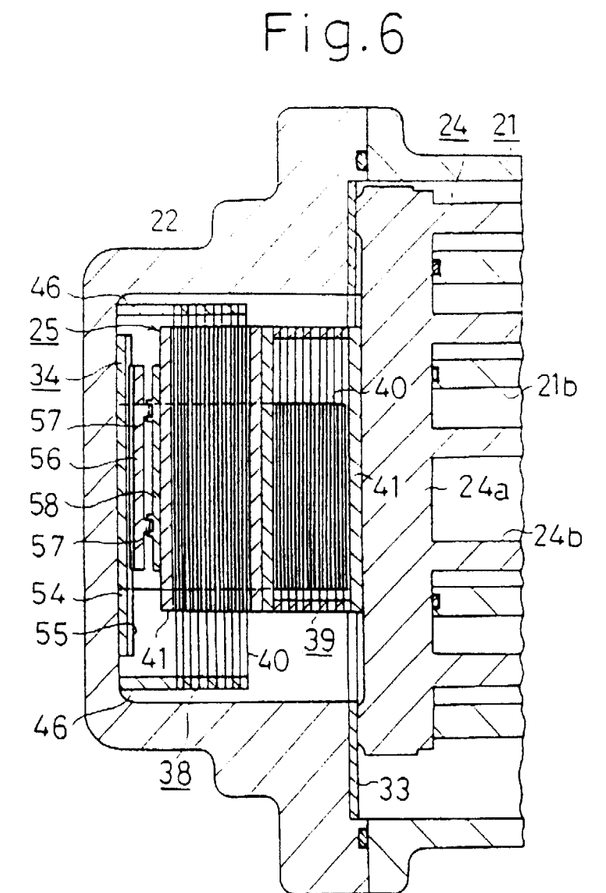
FIG. 6 is a partial cross-sectional view of the scroll type compressor according to a second embodiment of the present invention.
Figure 7:
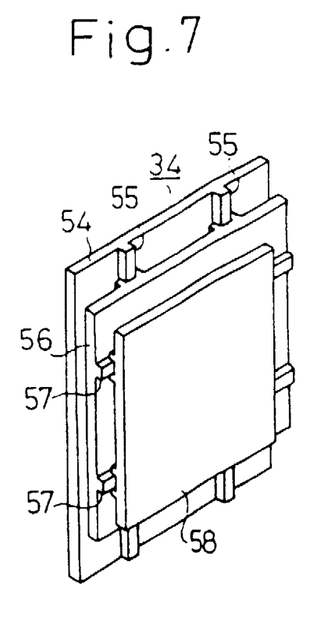
FIG. 7 is a perspective view of an anti-rotation mechanism of the compressor shown in FIG. 6.

Next, a second embodiment of the present invention will be described referring to FIGS. 6 and 7.

What is different in the second embodiment from the first embodiment is the anti-rotation mechanism for preventing rotation of the movable scroll 24. Specifically, in the second embodiment, the anti-rotation mechanism 34 is located between the inner surface of the front housing 22 and the movable member 41 of the electrostatic actuator 38.

The anti-rotation mechanism 34 has a base plate 54, which is secured to the inner surface of the front housing 22. A pair of first rails 55 are formed vertically on the inner surface of the base plate 54. A first restricting plate 56 is supported by the first rails 55 to be movable in the vertical direction and has a pair of second rails 57 formed crosswise on the inner surface. A second restricting plate 58 is supported by the second rails 57 to be movable crosswise, and the movable member 41 of the electrostatic actuator 38 is secured on the surface of the second restricting plate 58.

Accordingly, since the plates 56, 58 can only translate along the rails 55, 57, the movable members 41 of the electrostatic actuators 38,39 are restricted to translation without rotation. Further, the vertical and horizontal strokes of the movable members 41 in the electrostatic actuators 38,39 are restricted by the internal space of the front housing 22. However, the radius of revolution of the movable scroll 24 can be easily changed by changing the preset stroke values with the control unit 48, and the rotational orbit can be changed to ones other than round. This makes it possible, where the spiral elements 21b,24b of the scrolls 21,24 are given elliptic forms, to allow the movable scroll 24 to revolve on an elliptic orbit similar to such elliptic forms. As a result, scroll type compressors having various cross-sectional profiles, including an elliptic form, can be fabricated.

Figure 8:
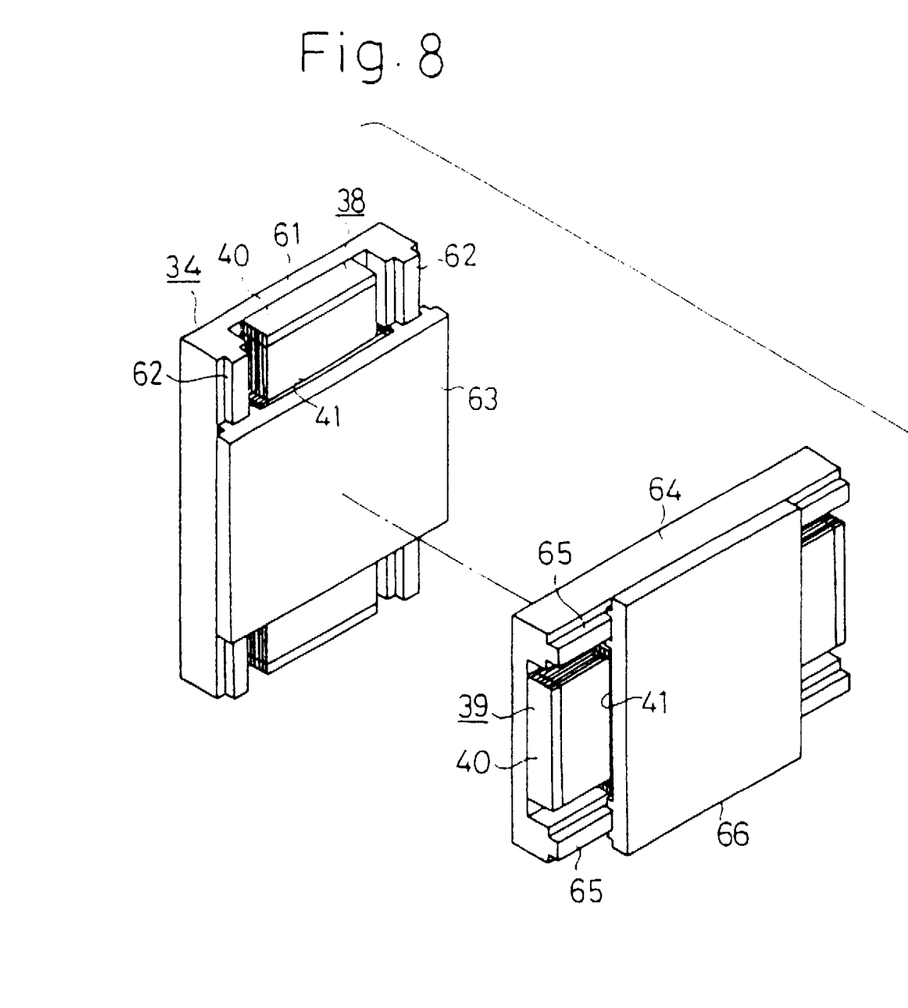
FIG. 8 is an exploded perspective view of a drive mechanism according to a third embodiment of the present invention.

In a third embodiment of the present invention shown in FIG. 8, the way of assembling the anti-rotation mechanism 34 with the electrostatic actuators 38,39 is different from that of the first embodiment. In the third embodiment, the anti-rotation mechanism 34, which is divided into halves, is assembled with the electrostatic actuators 38,39 to restrict the electrostatic actuators 38,39 to move only linearly.

The electrostatic actuators 38,39 of the anti-rotation mechanism 34 in the third embodiment have supporting plates 61,64 and movable plates 63,66, respectively. The first supporting plate 61 is secured to the inner surface of the front housing 22. A pair of first rails 62 are formed vertically on the surface of the first supporting plate 61, and the first movable plate 63 is supported by the first rails 62 to be movable in the vertical direction. The electrostatic actuator 38 is located between the first supporting plate 61 and the first movable plate 63. The fixed member 40 and the movable member 41 of the actuator 38 are fixed to the first supporting - plate 61 and the first movable plate 63, respectively.

The second supporting plate 64 is secured to the first movable plate 63, and a pair of second rails 65 are formed crosswise on the surface of the plate 64. The second movable plate 66 is supported by the second rails 65 to be movable linearly. The electrostatic actuator 39 is located between the second supporting plate 64 and the second movable plate 66. The fixed member 40 and the movable member 41 of the actuator 39 are secured to the second supporting plate 64 and the movable plate 66, respectively. The second movable plate 66 is secured to the base plate 24a of the movable scroll 24.

Accordingly, the compressor of the third embodiment exhibits the same actions and effects as the first and second embodiments. Further, since each electrostatic actuator is incorporated with a supporting plate and a movable plate, the anti-rotation mechanism 34 is easily assembled by combining two such assembly units.

A fourth embodiment of the present invention is shown in FIG. 9. What is different in the fourth embodiment from the first embodiment is the construction of the movable members 41 in the electrostatic actuators 38,39. Specifically, in the fourth embodiment, the movable members 41 are each composed of a sheet 70 of insulating material and a resistor layer 71 formed on the surface of the sheet 70. It should be noted that only one adjacent pair of a fixed member 40 and a movable member 41, of pairs of fixed members 40 and movable members 41, is shown in FIG. 9. As shown in FIG. 9, the fixed member 40 is of the same construction as in the first embodiment.

Figure 9A:
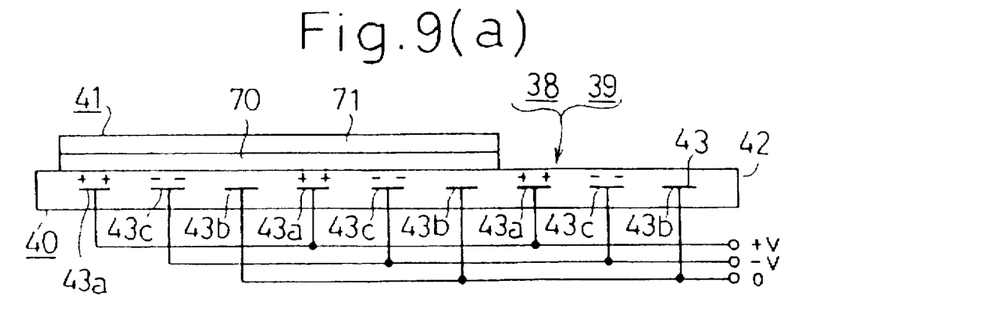
Figure 9B:
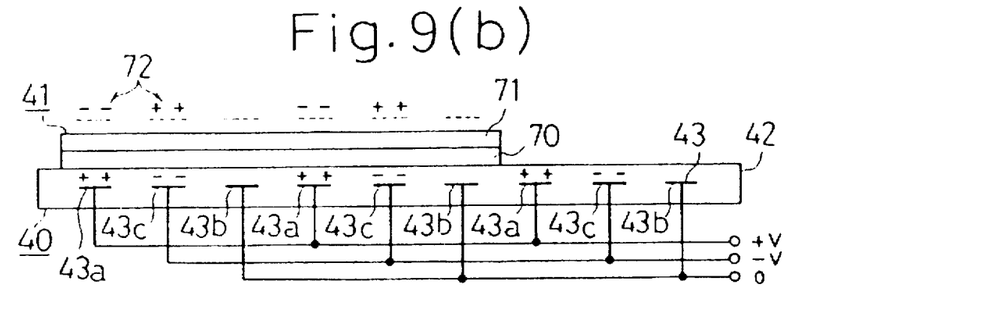

In the electrostatic actuators 38,39 according to the fourth embodiment, voltages +V, 0 and −V (v) are first applied respectively to the first to third electrodes 43a to 43c of the strip electrodes 43 in the fixed member 40, as shown in FIG. 9(a). Thus, induction charges 72 which are of opposite polarities to the charges on the electrodes 43 are induced on the resistor layer 71 of the second member 41 at the positions as indicated schematically by the dotted line in FIG. 9(b).

Figure 9C:
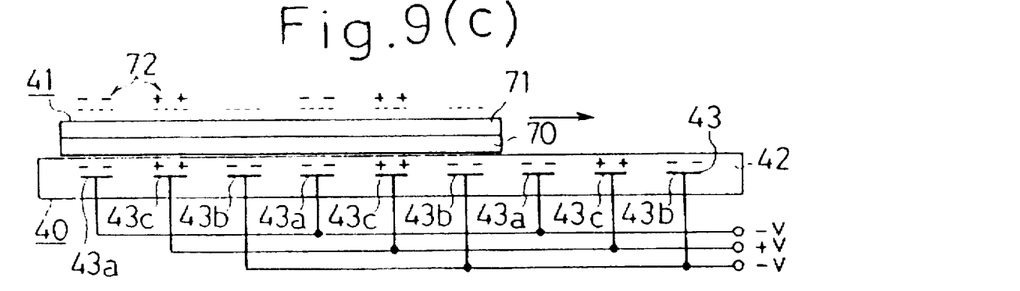

Then, as shown in FIG. 9(c), upon switching of the voltage application state with respect to the strip electrodes 43 of the fixed member 40, the potentials of the electrodes 43 are instantaneously changed. However, the induction charges 72 in the movable member 41 cannot be moved instantaneously due to the high resistance of the resistor layer 71. Thus, reactive forces are generated between the charges of the same polarity between these two members 40 and 41 to lift the movable member 41 momentarily. Meanwhile, the induction charges 72 on the movable member 41 are attracted by the charges of opposite polarities on the adjacent electrodes 43.

Figure 9D:
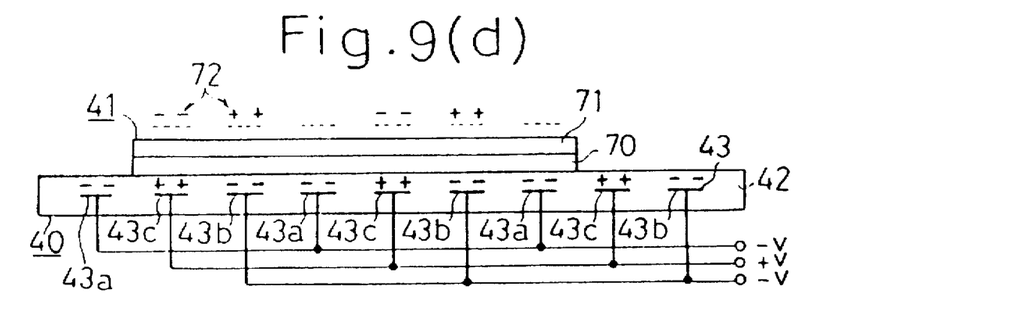

Consequently, as shown in FIG. 9(d), the movable member 41 is shifted by one pitch of the arrangement of the strip electrodes 43 and relocated as such onto the fixed member 40. By repeating the actions shown in FIGS. 9(a) to 9(d), the movable member 41 is moved along the surface of the fixed member 40 along the direction of the row of strip electrodes 43.

If the voltages to be applied to the first members 40 of the electrostatic actuators 38,39 are controlled by the control unit 48 as described above, the movable scroll 24 can be revolved by applying to the scroll 24 forces in two directions that are substantially orthogonal to each other. Thus, the same actions and effects as in the first embodiment are achieved in the fourth embodiment.

Particularly, in the fourth embodiment, no strip electrode is provided on the movable members 41. Accordingly, voltage may be applied to the fixed members 40 and not to the movable members 41. This simplifies the control of the electrostatic actuators 38,39.

Figure 10:
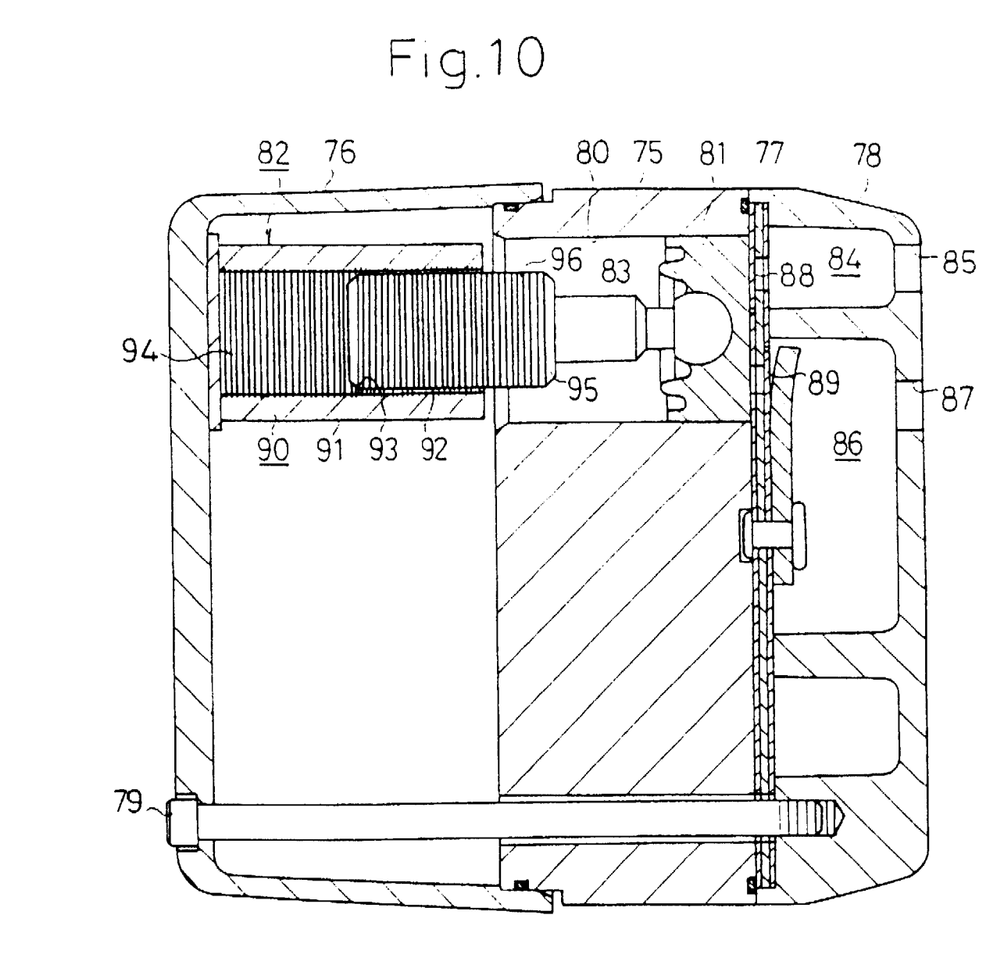
FIG. 10 is a cross-sectional view of a piston type compressor according to a fifth embodiment of the present invention.
Figure 11:
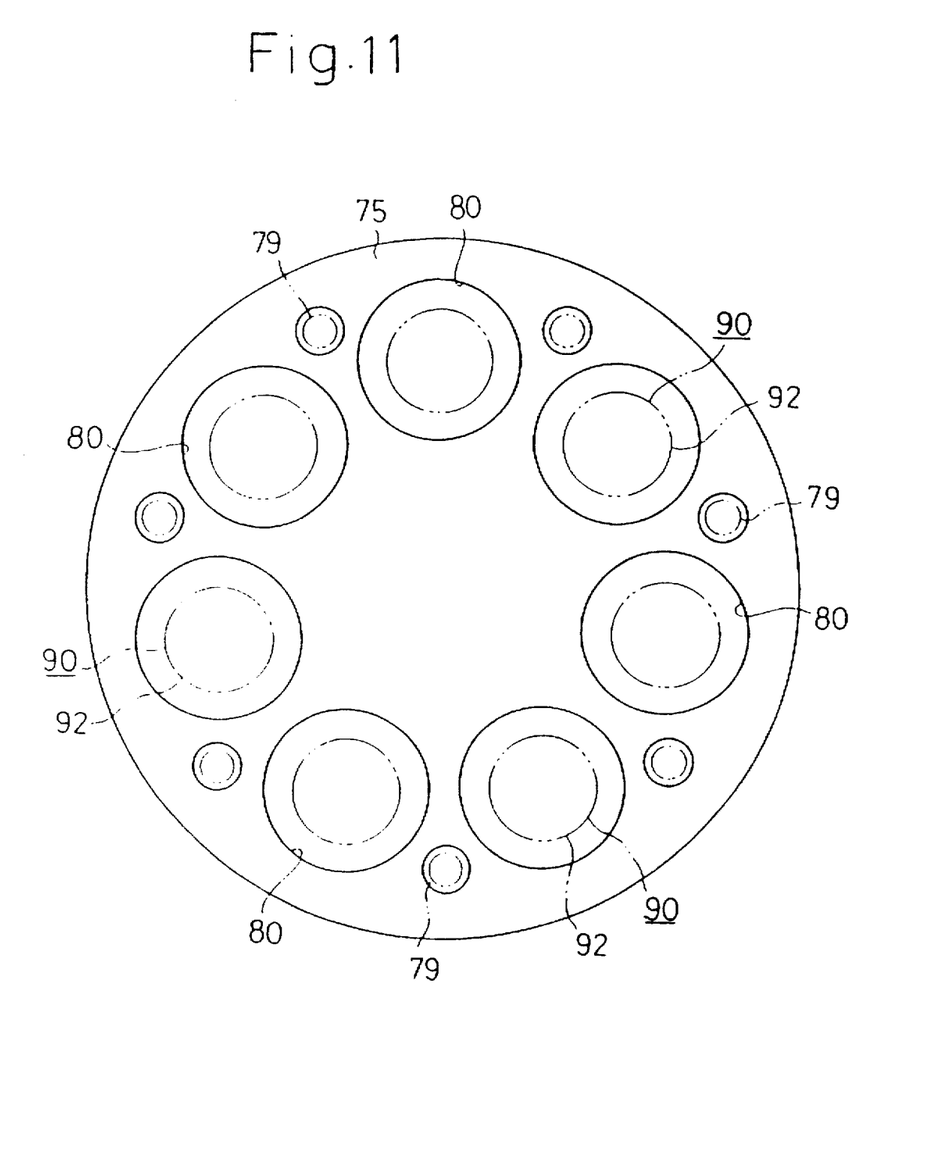
FIG. 11 is an end view of a cylinder block of the compressor shown in FIG. 10.

Next, a fifth embodiment of the present invention embodied in a piston type compressor will be described referring to FIGS. 10 and 11.

The piston type compressor has a cylinder block 75 having a substantially cylindrical form and is combined at the front end with a front housing 76 and at the rear end with a rear housing 78 with a valve plate 77. A plurality of through bolts 79 penetrate the front housing 76, the cylinder block 75 and the valve plate 77 and are screwed into the rear housing 78 to fasten the front housing 76 and the rear housing 78 to each end face of the cylinder block 75.

A plurality of cylinder bores 80 are formed in the cylinder block 75 at a predetermined angular interval, and a piston 81 is reciprocatively located in each bore 80. The pistons 81 each has drive unit 82 disposed in the front housing 76, and each drive unit 82 is connected to its associated piston 81 with a piston rod 83. The pistons 81 are reciprocated by these drive units 82 to compress the gas in the compression chambers defined in the cylinder bores 80.

An annular suction chamber 84 is defined along the circumferential edge of the rear housing 78 and is connected to an external circuit (not shown) via an inlet 85. A discharge chamber 86 is defined at the center of the rear housing 78 and is connected to an outer circuit via an outlet 87. The valve plate 77 has suction valve mechanisms 88 which enable suction of the gas from the suction chamber 84 into the compression chamber of each cylinder bore 80. The valve plate 77 is also provided with discharge valve mechanisms 89 which enable discharge of the gas compressed in the compression chamber of each cylinder bore 80 into the discharge chamber 86.

In this embodiment, each piston 81 is provided with a drive unit 82, and each drive unit 82 is composed of one electrostatic actuator 90. Each electrostatic actuator 90 consists of a cylindrical fixed element 91 secured on the inner surface of the front housing 76 and a columnar movable element 92 connected to the piston rod 83. The movable elements 92 are situated concentrically in the fixed elements 91 such that they may be moved axially.

The fixed element 91 of each electrostatic actuator 90 has an insulating sheet 93 on the inner circumference, in which a number of strip electrodes 94 are embedded at a predetermined pitch. The movable element 92 has an insulating sheet 95 on the outer circumference, in which a number of strip electrodes 96 are embedded at a predetermined pitch. Three-phase AC voltages, i.e., first to third control signals SG1 to SG3, are applied by the DSP 47 to the electrodes 94,96 of the fixed element 91 and the movable element 92 under the control of the control unit 48 like in the first embodiment shown in FIG. 3.

In the piston type compressor according to the fifth embodiment, when the first to third control signals SG1 to SG3 are applied to the electrodes 94,96 of the fixed element 91 and the movable element 92 in each electrostatic actuator 90, a Coulomb force is induced between the electrodes 94 and 96 like in the first embodiment. The movable element 92 is reciprocated by this Coulomb force in the direction of the rows of electrodes 94,96 to reciprocate the piston 81 via the piston rod 83 in the cylinder bore 80. Thus, the gas in the suction chamber 84 is drawn into the compression chamber 80 of the cylinder bore 80 through the suction valve mechanism 88, and after the gas is compressed, it is discharged into the discharge chamber 86 through the discharge valve mechanism 89.

As described above, in the piston type compressor according to the fifth embodiment, each piston 81 is directly reciprocated by the corresponding electrostatic actuator 90 as the drive unit 82 to effect compression of the gas. Accordingly, unlike the prior art compressors, the compressor does not need to be connected to a large drive source such as a motor or an engine, but a compact drive source is incorporated into the compressor, and thus the overall size and weight of the compressor is reduced. If the compressor according to this embodiment is employed for air-conditioning a vehicle, the engine is free from the direct load of the compressor, and the compressor can be situated at a desired position irrespective of the location of the engine.

Further, in the piston type compressor according to the fifth embodiment, unlike the prior art compressors, there is no need to provide a drive mechanism for converting the rotation of the rotary shaft into reciprocating motion of the pistons, but the pistons 81 are reciprocated directly. Accordingly, not only is the internal structure of the compressor simplified, but vibration and noise are reduced, and driving efficiency is improved.

Moreover, in the compressor according to the fifth embodiment, the set values of stroke and velocity of the movable element 92 relative to the fixed element 91 in each electrostatic actuator 90 can be changed easily with the control unit 48. Thus, the stroke and velocity of the piston 81 can be changed easily, so that the capacity of the compressor can be suitably changed as necessary. In other words, a variable capacity compressor can be realized only by the control of the control unit 48 without employing a complicated mechanical structure.

Next, other embodiments of the present invention will be described referring to FIGS. 12 and 13.

Figure 12:
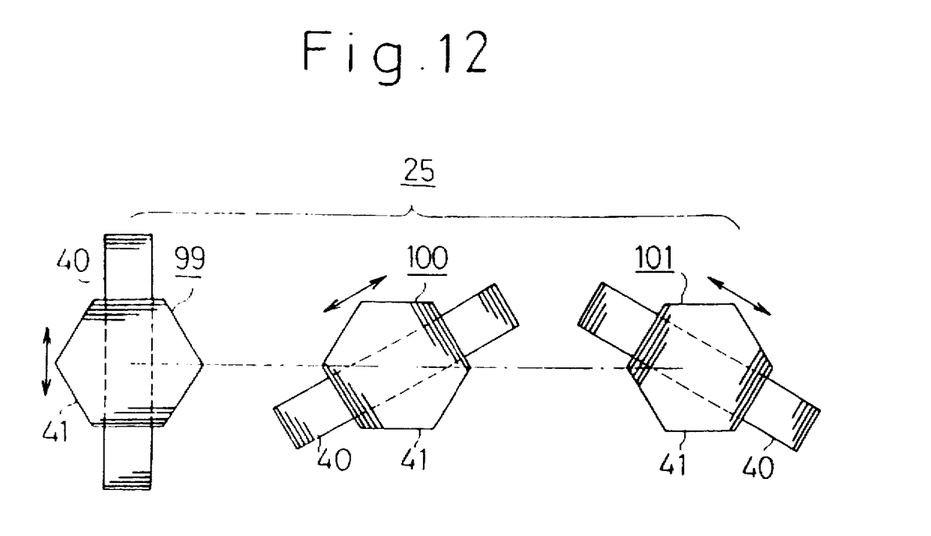
FIG. 12 is an exploded front view of a drive mechanism according to another embodiment of the present invention.

In the embodiment shown in FIG. 12, the drive unit 25 for revolving the movable scroll 24 in the scroll type compressor in any of the first to third embodiments is composed of three electrostatic actuators 99,100,101 arranged to overlap in alignment with one another. These electrostatic actuators 99,100,101 are adapted to apply forces to the movable scroll 24 in three directions, which intersect with one another at an angle of about 60° on a plane orthogonal to the axis of the scroll 24. According to this constitution, the movable scroll 24 can be revolved more smoothly than in the first to third embodiments.

Figure 13:
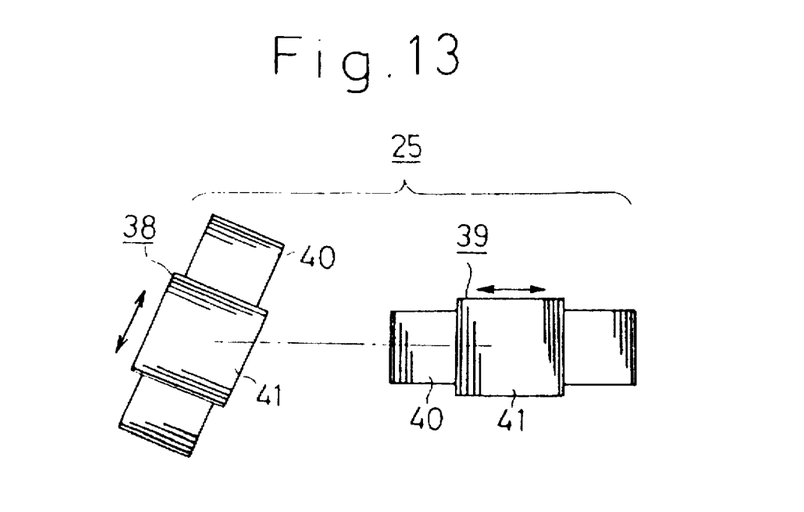
FIG. 13 is an exploded front view of a drive mechanism according to another embodiment of the present invention.

In the embodiment shown in FIG. 13, two electrostatic actuators 38,39 constituting the drive unit 25 in the scroll type compressor in any of the first to third embodiments are arranged to overlap in alignment with each another and are adapted to move in two directions which intersect with each other at a predetermined angle other than a right angle. Accordingly, in this embodiment, forces are applied to the movable scroll 24 in two directions that intersect with each other at a predetermined angle on a plane orthogonal to the axis of the scroll 24. The same operation and effects as in the first to third embodiments are exhibited again in this embodiment.

Further, the present invention may be modified and embodied in the following manners:

(1) In the scroll type compressors according to the first to fourth embodiments, the drive unit 25 may be composed of four or more electrostatic actuators, so that moving forces may be applied to the movable scroll 24 in four or more directions on a plane orthogonal to the axis of the scroll 24;

(2) In the electrostatic actuators 38,39 according to the fourth embodiment shown in FIG. 9, the fixed element may be composed of a member 41 having a resistor layer 71, and the movable element may be composed of a member 40 having strip electrodes 43;

(3) The embodiment shown in FIG. 12 or 13 may be embodied in combination with the fourth embodiment shown in FIG. 9;

(4) In the first to fifth embodiments, an insulating solution may be sealed in the front housing 22,76 in which electrostatic actuators 38,39,90 are disposed. Thus, dielectric breakdown strength of the electrostatic actuators 38,39,90 can be further improved so that a higher voltage is applied to the electrostatic actuators 38,39,90 so as to increase their driving forces. In an airconditioner compressor, the refrigerant gas can be utilized as the insulating material;

(5) In the fifth embodiment, the fixed element 91 and the movable element 92 in the electrostatic actuator 90 may be allowed to have layered structures like in the first embodiment. Further, the fixed element 91 may be allowed to take other forms such as a square tubular form instead of the cylindrical form. The movable element 92 may be allowed to have a cylindrical form. Otherwise, the fixed and movable elements 91,92 may be allowed to have plate-like forms; and (6) In the first to fifth embodiments, rectangular wave voltage signals may be sent to the electrostatic actuators 38,39,90 instead of the three-phase AC voltage signals.

Therefore, the present examples and embodiments are to be considered as illustrative and not restrictive, and the invention is not to be limited to the details given herein, but may be modified within the scope of the appended claims.

What is claimed is:

1. A compressor having a casing a fixed scroll member fixed to said casing and having a base plate and a scroll element, and a movable scroll member having a base plate and a scroll element, said scroll elements being engaged with each other and defining a compression chamber between them which compression chamber moves toward the centers of the scroll elements from the peripheries of the scroll elements to compress a gas when said movable scroll element is driven directly by a drive apparatus comprising:

a plurality of electrostatic actuators located within said casing for applying driving forces to the movable scroll member in at least two different directions within parallel planes which are parallel to the base plate of the movable scroll member;

each of said electrostatic actuators includes:

a fixed drive member fixed to said casing and having a plurality of first electrode strips arranged in a single direction with a predetermined pitch; and a movable drive member fixed to said movable scroll member, said movable scroll member being driven in accordance with the relative movement generated between said fixed drive members and said movable drive members in response to Coulomb force generated between said fixed and movable drive members when voltage is applied to said first electrode strips.

2. The compressor according to claim 1 further comprising a mechanism for preventing said movable scroll member from rotating about its own axis.

3. The compressor according to claim 2, wherein said mechanism is located between said movable scroll member and said casing, said mechanism including:

a plurality of movable pins projecting from said base plate of said movable scroll member at a predetermined position;

a plurality of fixed pins projecting from said casing in the vicinity of said movable pins, each fixed pin being paired with one of said movable pins; and a plurality of rings each loosely fitted around one pair of pins, said rings restricting the range of the orbital movement of the movable scroll member based on the engagement of said pairs with said rings.

4. The compressor according to claim 2, wherein said mechanism is located between said drive apparatus and said casing, said mechanism including:

a support plate fixed to said casing and having a pair of rails extending in a first direction;

a movable plate movably supported on said rails of said support plate and having a pair of rails extending in a direction different from the first direction; and a restriction plate movably supported on said rails of said movable plate and connected to said movable drive member, wherein the restriction plate is prevented from rotating with respect to said casing.

5. The compressor according to claim 1, wherein each of said fixed and movable drive members has a plurality of laminated sheets that are made of an insulating material, each sheet of said fixed and movable drive members having said plurality of electrode strips built-in, and the sheets of said fixed drive member and the sheets of said movable drive member being interleaved.

6. The compressor according to claim 2, wherein said fixed drive member has a plurality of laminated sheets that are made of an insulating material each of which has said plurality of electrode strips built-in, and wherein said movable drive member has a plurality of sheets each of which has a resistance layer, each sheet of said fixed drive member and each sheet of said movable drive member being alternately arranged.

7. The compressor according to claim 1 further comprising:

a cylinder block having at least one cylinder bore; and a piston serving as said compressing member accommodated in each cylinder bore for reciprocation, wherein said fixed drive member is fixed to said casing and said movable drive member is connected to said piston with a piston rod.

8. The compressor according to claim 7, wherein said electrode strips of said fixed and movable drive member extend circumferentially and are arranged coaxially with each other and in the direction of the axes of said fixed and movable drive members.

9. A compressor including a fixed scroll member fixed to a casing and having a base plate and a scroll element, and a movable scroll member having a base plate and a scroll element, said scroll elements being engaged with each other with a compression chamber defined between them so that said compression chamber moves toward the centers of the scroll elements from the peripheries of the scroll elements to compress a gas when said movable scroll element is directly moved along an orbital path by means of a drive apparatus which is constituted by a plurality of electrostatic actuators for applying driving forces in a plurality of different directions within parallel planes to said movable scroll member, each of said parallel planes being parallel to the base plate of said movable scroll member, each electrostatic actuator comprising:

a fixed drive member having a plurality of first electrode strips arranged in a single direction with a predetermined pitch; and a movable drive member having a plurality of second electrode strips arranged in the same direction as said first electrode strips with said predetermined pitch, said fixed and movable drive members being located opposite to each other so that said movable drive member moves in said single direction in response to Coulomb force generated between said fixed and movable electrode strips when voltage is applied to said fixed and movable electrode strips.

10. The compressor according to claim 9 further comprising a mechanism for preventing said movable scroll member from rotating about its own axis.

11. The compressor according to claim 10, wherein said mechanism is located between said movable scroll member and said casing, said mechanism including:

a plurality of first pins projecting from said base plate of said first movable scroll member at a predetermined position;

a plurality of fixed pins projecting from said casing in the vicinity of said movable pins, each fixed pin being paired with one of said pins; and a plurality of rings each loosely fitted around one pair of said pins, said rings restricting the range of the orbital movement of the movable scroll member based on the engagement of said pairs with said rings.

12. The compressor according to claim 10, wherein said mechanism is located between said drive apparatus and said casing, said mechanism including:

a support plate fixed with said casing and having a pair of rails extending in a first direction;

a movable plate movably supported on said rails of said support plate and having a pair of rails extending in a direction different from the first direction; and a restriction plate movably supported on said rails of said movable plate and connected to said movable drive member, wherein the restriction plate is prevented from rotating with respect to said casing.

13. The compressor according to claim 9, wherein said drive apparatus includes:

a pair of said fixed drive members fixed to said casing, said fixed drive members being overlapped with each other, said electrode strips of one fixed drive member extending in a direction different from that of the other fixed drive member; and a pair of said movable drive members movably mounted on the associated fixed drive members, said movable drive members being connected to each other and connected to said movable scroll member, said electrode strips of each movable drive member extending in the same direction as said electrode strips of each associated fixed drive member.

14. The compressor according to claim 13, wherein each of said fixed and movable drive members has a plurality of laminated sheets that are made of an insulating material, each sheet of fixed and movable drive members having said plurality of electrode strips built-in, and the sheets of said fixed drive member and the sheets of movable drive member being interleaved.

15. The compressor according to claim 9, wherein the fixed drive member of a first one of said plurality of said electrostatic actuators is fixed to said casing, and wherein the rest of said electrostatic actuators are supported on the movable drive member of said first electrostatic actuator; and wherein said movable scroll member is mounted on the movable drive member of a last one of said rest of said electrostatic actuators in the order of their support.

16. The compressor according to claim 15, wherein said plurality of electrostatic actuators include two electrostatic actuators that apply said driving forces in two directions perpendicular to each other in said single plane to said movable scroll.

17. The compressor according to claim 15, wherein said plurality of electrostatic actuators include three electrostatic actuators that apply said driving forces in three directions different in a single plane to said movable scroll.

* * * * *

UNITED STATES PATENT AND TRADEMARK OFFICE
CERTIFICATE OF CORRECTION

PATENT NO. : 5,791,883

DATED : August 11, 1998

INVENTOR(S) : BAN et al.

It is certified that error appears in the above-identified patent and that said Letters Patent is hereby corrected as shown below:

Column 7, line 53, change " supporting - plate 61" to --supporting plate 61" .

Column 11, line 21, after " casing" insert a (comma) --,--.

Column 13, line 2, after " said" delete --first--;

Column 13, line 6, after " said" insert --first--.

Signed and Sealed this

Nineteenth Day of September, 2000

Attest:

Q. TODD DICKINSON

*Attesting Officer*   *Director of Patents and Trademarks*